No. 863,340. PATENTED AUG. 13, 1907.
C. M. WRIGHT.
CHEESE CUTTER.
APPLICATION FILED MAY 11, 1907.

Witnesses
K. R. Clendening.
Thomas W. McMeans

Inventor
Charles M. Wright,
By Bradford Hood
Attorneys.

UNITED STATES PATENT OFFICE.

CHARLES M. WRIGHT, OF ANDERSON, INDIANA.

CHEESE-CUTTER.

No. 863,340.　　　Specification of Letters Patent.　　　Patented Aug. 13, 1907.

Application filed May 11, 1907. Serial No. 373,133.

*To all whom it may concern:*

Be it known that I, CHARLES M. WRIGHT, a citizen of the United States, residing at Anderson, in the county of Madison and State of Indiana, have invented certain new and useful Improvements in Cheese-Cutters, of which the following is a specification.

The object of my invention is to produce a simple yet efficient cutter by means of which cheese and other similar articles may be cut into desired and uniform sizes.

Figure 1:
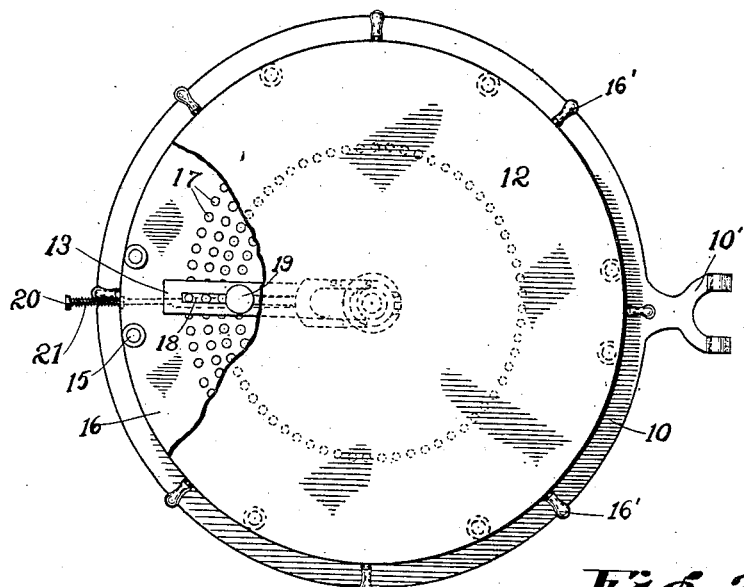
Figure 2:
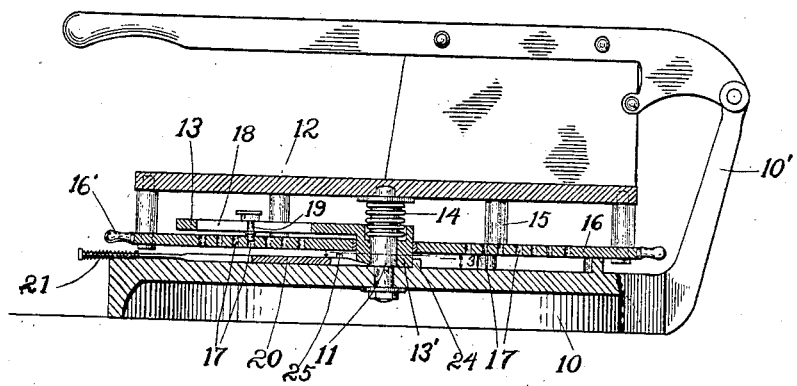
Figure 3:
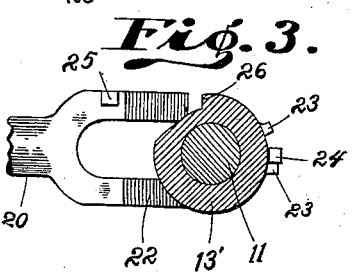

The accompanying drawings illustrate my invention:

Figure 1 is a plan with the knife omitted and a portion of the cheese carrying table broken away; Fig. 2 a central vertical section, and Fig. 3 a detail, on a larger scale, on line 3 of Fig. 2.

In the drawings 10 indicates a suitable supporting base provided at one side with a knife-supporting arm 10'. Secured to the center of base 10, and arising therefrom, is a central pivot pin 11 which, at its upper end, forms a pivotal support for the cheese-carrying table 12. Sleeved upon pin 11 beneath table 12 is an arm 13 provided with a hub 13' which is normally urged downward upon pin 11 by a light spring 14. Connected to the underside of table 12 by suitable spacing pins 15 is a gage plate 16 through which hub 13' passes, the said gage plate rotating with the table 12. Gage plate 16 is provided with a plurality of concentric series of pin holes 17, the holes of each series being arranged such distance apart as will produce a desired segment of cheese of a given weight or value. For instance, the holes in the inner series may be such distance apart that the complete series will comprise forty-eight holes which, for a 12 pound cheese, would divide the cheese into forty-eight wedges, each weighing one-quarter pound. Similarly the other series of holes may be properly spaced for cheeses weighing thirteen pounds, fourteen pounds, etc. Or, if desired, the series of holes may be provided for different total values of cheese, whereupon the distance between the holes of a given series would be arranged so that the cheese might be divided into successive wedges of a given unit value, say five or ten cents each.

Arm 13 is provided with a longitudinal slot 18 which extends radially over the plate 16 and adjustably mounted in said slot is a pin 19 the lower end of which is adapted to enter any one of any of the series of holes 17, being normally held in any particular hole by means of the spring 14. In order to manipulate the arm 13 I provide a plunger 20, the outer end of which is easily accessible when the plunger is normally held in operative position by means of a light spring 21. At the inner end the plunger 20 is bifurcated, as shown in Fig. 2, and the arms are vertically beveled, as shown at 22, the said beveled ends lying beneath the lower end of hub 13'. Hub 13' is provided with a pair of fingers 23—23 which straddle a stationary lug 24 carried by the base 10, the fingers 23 being spaced apart enough to permit a limited swing to hub 13' on pin 11, said limited swing being preferably only sufficient to permit the arm 13 to swing through an arc equal to the greatest distance between two holes 17 in any series. Fingers 23 in the form shown in the drawings, can be attached to hub 13' after it has been passed through plate 16. In order to automatically rock the arm upon pin 11, I provide the plunger 20 with a pin or lug 25 adapted to engage a shoulder 26 formed on hub 13'.

The operation is as follows: By pushing in upon plunger 20 the wedges 22 thereof will first raise hub 13' on pin 11 and thus withdraw pin 19 from the hole 17 in which it has been lying. As the plunger 20 is pushed inward to its extreme movement lug 25 will engage shoulder 26 and swing arm 13 through an arc sufficient to bring pin 19 over a new hole 17. Thereupon plunger 20 is released and its spring 21 returns it to normal position, whereupon spring 14 drives arm 13 downward so as to insert pin 19 in the new hole 17 and thus lock the arm 13 to plate 16. As soon as this action is completed the operator grasps any one of a series of handles 16' formed on plate 16 and swings said plate as far as possible, the movement being limited by the engagement of one of the fingers 23 with lug 24. This action of the parts will produce an advancement of the table 12 through a unit arc thus carrying a unit quantity of cheese beneath the cutter.

If more than one unit of cheese is desired at a particular time the operation already described is repeated successively until the desired number of units have been carried beneath the knife, whereupon the knife is manipulated in a manner well known in the art.

It will be readily understood that many changes in details of construction may be made without departing from my invenion.

I claim as my invention:

1. In a cheese cutter, the combination, with a suitable supporting base, of a cheese-carrying table rotatably mounted thereon, a gage plate carried by said table, a gage arm extending over said plate, intermediate withdrawable connections between said arm and plate, and means for limiting the movement of said arm.

2. In a cheese cutter, the combination, with a suitable supporting base, of a cheese-carrying table rotatably mounted thereon, a gage plate carried by said table and provided with a plurality of concentric series of holes, a gage arm concentric with the table, a pin adjustably mounted on said arm and adapted to be set in position to coact with any series of holes in the gage plate, means for axially and angularly shifting said arm, and means for restricting the angular movements thereon.

3. In a cheese cutter, the combination, with a suitable supporting base, of a cheese-carrying table rotatably mounted thereon, a pair of gage members, one carried by the table and the other having a limited angular movement with and independently of the table, said gage members having separable interengaging portions.

4. In a cheese cutter, the combination, with a suitable supporting base, of a cheese-carrying table rotatably mounted thereon, a pair of gage members, one carried by the table and the other having a limited angular movement with and independently of the table, said gage members having separable interengaging portions, and means for operating one of said gage members relatively to the other.

5. In a cheese cutter, the combination, with a suitable supporting base, of a cheese-carrying table rotatably mounted thereon, a gage plate carried by said table, a gage arm extending over said plate, intermediate withdrawable connections between said arm and plate, means for limiting the angular movement of said arm, and means for withdrawing the connections between the arm and the plate and for shifting the arm angularly.

6. In a cheese cutter, the combination, with a suitable supporting base, of a cheese-carrying table rotatably mounted thereon, a gage plate carried by said table and provided with a plurality of concentric series of gage members, a gage arm mounted concentric with the table and plate, an adjustable member carried by said arm and adapted to be set in position to coöperate with any one of the series of gage members carried by said plate, and means for limiting the angular movement of said arm.

7. In a cheese cutter, the combination, with a suitable supporting base, of a cheese-carrying table rotatably mounted thereon, a gage plate carried by said table and provided with a plurality of concentric series of gage members, a gage arm mounted concentric with the table and plate, an adjustable member carried by said arm and adapted to be set in position to coöperate with any one of the series of gage members carried by said plate, means for limiting the angular movement of said arm, and means for shifting said arm both axially and angularly.

8. In a cheese cutter, the combination, with a suitable supporting base, of a cheese carrying table rotatably mounted thereon, a gage plate carried by said table and provided with several concentric series of gage members, a gage arm extended over said plate and rotatably supported, means carried by said arm for coöperating with any one of the series of gage members of the gage plate, a plunger provided with means for shifting said arm axially and angularly, and means for limiting the angular movement of said arm.

In witness whereof, I, have hereunto set my hand and seal at Anderson, Indiana, this 8th day of May, A. D. one thousand nine hundred and seven.

CHARLES M. WRIGHT. [L. S.]

Witnesses:
THOS. BAGOT,
WALTER VERMILLION.